United States Patent [19]

Ushio

[11] Patent Number: 4,826,471

[45] Date of Patent: May 2, 1989

[54] AUTOMATIC POWER TRANSMISSION BELT TENSIONER

[75] Inventor: Kozo Ushio, Kobe, Japan

[73] Assignee: Mitsuboshi Belting, Ltd., Nagata, Japan

[21] Appl. No.: 194,094

[22] Filed: May 16, 1988

[30] Foreign Application Priority Data

Jun. 5, 1987 [JP] Japan .................... 62-141969

[51] Int. Cl.⁴ .............................. F16H 7/12
[52] U.S. Cl. ................................. 474/135
[58] Field of Search ............ 474/101, 109, 111, 113, 474/114, 115, 117, 133, 135

[56] References Cited

U.S. PATENT DOCUMENTS 4,583,962 4/1986 Bytzek et al. ................. 474/135 X Primary Examiner—Thuy M. Bui
Attorney, Agent, or Firm—Wood, Dalton, Phillips, Mason & Rowe

[57] ABSTRACT

An automatic power transmission belt tensioner having spring structure for providing a dual biasing of an idler roller against the power transmission belt. The biasing structure provides a dual biasing of the arm carrying the idler roller including a biasing under torsion and a biasing under compression of the spring structure. In one form, a pair of biasing springs is utilized, one for providing the torsion biasing and one for providing the compressional biasing. In another form, a single spring effects both of the dual biasing actions. The compressional biasing structure includes a pair of cams having cooperating inclined surfaces for effecting compression of the compression spring as a function of the movement of the idler roller arm.

20 Claims, 3 Drawing Sheets

AUTOMATIC POWER TRANSMISSION BELT TENSIONER

TECHNICAL FIELD

This invention relates to power transmission belt drives and in particular to apparatus for automatically tensioning the belt in the operation of the drive.

BACKGROUND ART

Power transmission belts, such as V-belts, are utilized in drive systems wherein the belt is trained about a plurality of pulleys. A common example of such a drive system is that of an automotive vehicle wherein the power transmission belt is trained about a drive shaft pulley and one or more pulleys for driving auxiliary equipment.

It has been found that in the operation of such a drive, the belt tends to change its length for a number of reasons. When the belt elongates, the tension in the belt drops so as to provide a reduction in the drive efficiency of the system.

It is, therefore, common to provide a belt tensioner in the form of an idler roller urged against the back side of the belt at a slack portion thereof between the drive pulley and the last driven pulley.

The idler roller is normally carried on the end of an idler arm which is swingably mounted to a support, such as a shaft mounted to the engine block, or the like. It is conventional to provide helical spring means for resiliently urging the arm to cause the idler roller to engage the belt and apply a tensioning force to the belt determined by the force of the spring means.

It is conventional to operate the spring means in torsion to bias the idler roller arm in the belt tensioning direction. Alternatively, it is known to utilize a cam unit and a spring operatively associated with the cam unit to effect the desired urging of the idler roller arm.

A problem has arisen in the use of such spring-biased tensioners, in that vibrations in the belt tend to cause the tensioner to vibrate causing variations in the belt tension, irregular wear of the belt, and possible movement of the belt from the drive system pulleys.

It is desirable to maintain an optimum tension in the belt at all times and such vibration prevents such maintained efficient operation of the drive system.

DISCLOSURE OF INVENTION

The present invention comprehends an improved apparatus for tensioning a power transmission belt which effectively minimizes vibration of the idler roller notwithstanding substantial vibration in the belt during operation of the drive system.

More specifically, the invention comprehends the provision of an improved spring means for biasing the idler roller support which includes spring means acting in torsion and acting in compression for applying a dual biasing force to the support.

In one form, the spring means comprises a pair of helical springs and, in another form, the spring means comprises a single helical spring performing both functions.

In the illustrated embodiment, the spring means acting in compression includes cam means for converting angular displacement of the support about the mounting means to variable compression thereof.

In the embodiment wherein a pair of springs is utilized as the spring means, one of the springs acts in torsion and the other acts in compression. The cam means converts angular displacement of the arm about the mounting means to a variable compression of the second spring.

In the illustrated embodiment, the cam means comprises cooperating inclined surfaces.

In the illustrated embodiment, the mounting means comprises a shaft defining a longitudinal axis about which the support swings. The spring means comprises helical spring means extending coaxially about the axis.

In the illustrated embodiment, the torsion spring comprises a helical spring extending coaxially also about the shaft axis. The invention further comprehends the provision of means on the second cam slidably engaging the first cam for limiting the movement of the second cam toward the first cam.

In the illustrated embodiment, the second cam is splined to the shaft carrying the support arm so as to be rotatively fixed axially movable thereon.

The automatic tensioner of he present invention is extremely simple and economical of construction while yet providing the highly improved results discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
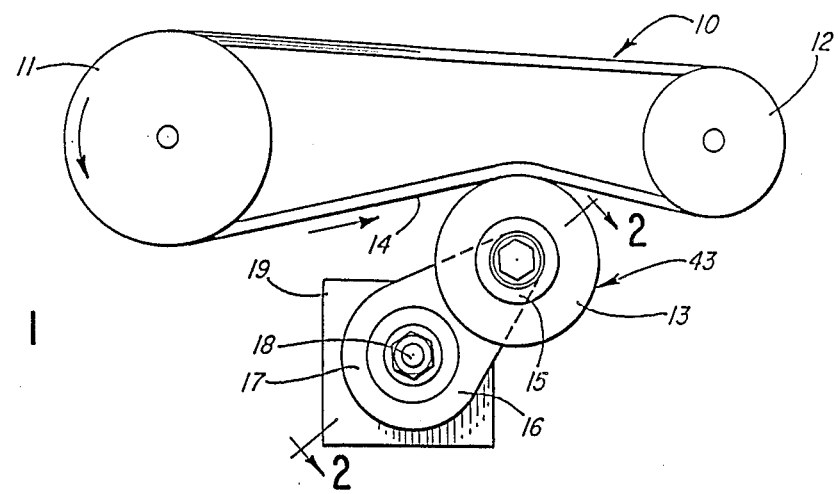
FIG. 1 is a diagrammatic side elevation illustrating a drive system having an automatic tensioner embodying the invention for maintaining tension in the belt of the drive system.
Figures 3, 4, 5, 6:
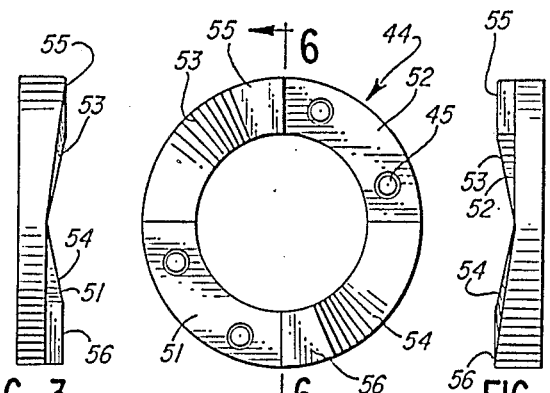
FIG. 3 is a left side elevation of a first cam of the tensioner.
FIG. 4 is a plan view thereof.
FIG. 5 is a right side elevation thereof.
FIG. 6 is a vertical section taken substantially along the line 6—6 of FIG. 4.
Figures 7, 8, 9, 10:
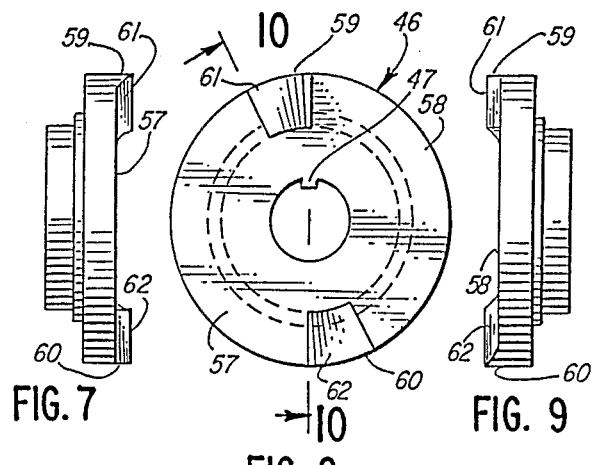
FIG. 7 is a left side elevation of the second cam.
FIG. 8 is a front elevation thereof.
FIG. 9 is a right side elevation thereof.
FIG. 10 is a vertical section taken substantially along line 10—10 of FIG. 8.

In the illustrative embodiment of the invention as disclosed in FIGS. 1-10 of the drawing, a power transmission belt generally designated 10 is trained about a plurality of pulleys, such as driver pulley 11 and driven pulley 12. An idler roller, or pulley, 13 is urged against the backside 14 of the belt in the low tension portion thereof between the driver pulley and the driven pulley, as illustrated in FIG. 1.

The idler roller is mounted at one end 15 of a support arm 16 having its opposite end 17 rotatively mounted to a shaft 18 carried by a housing 19.

Figure 2:
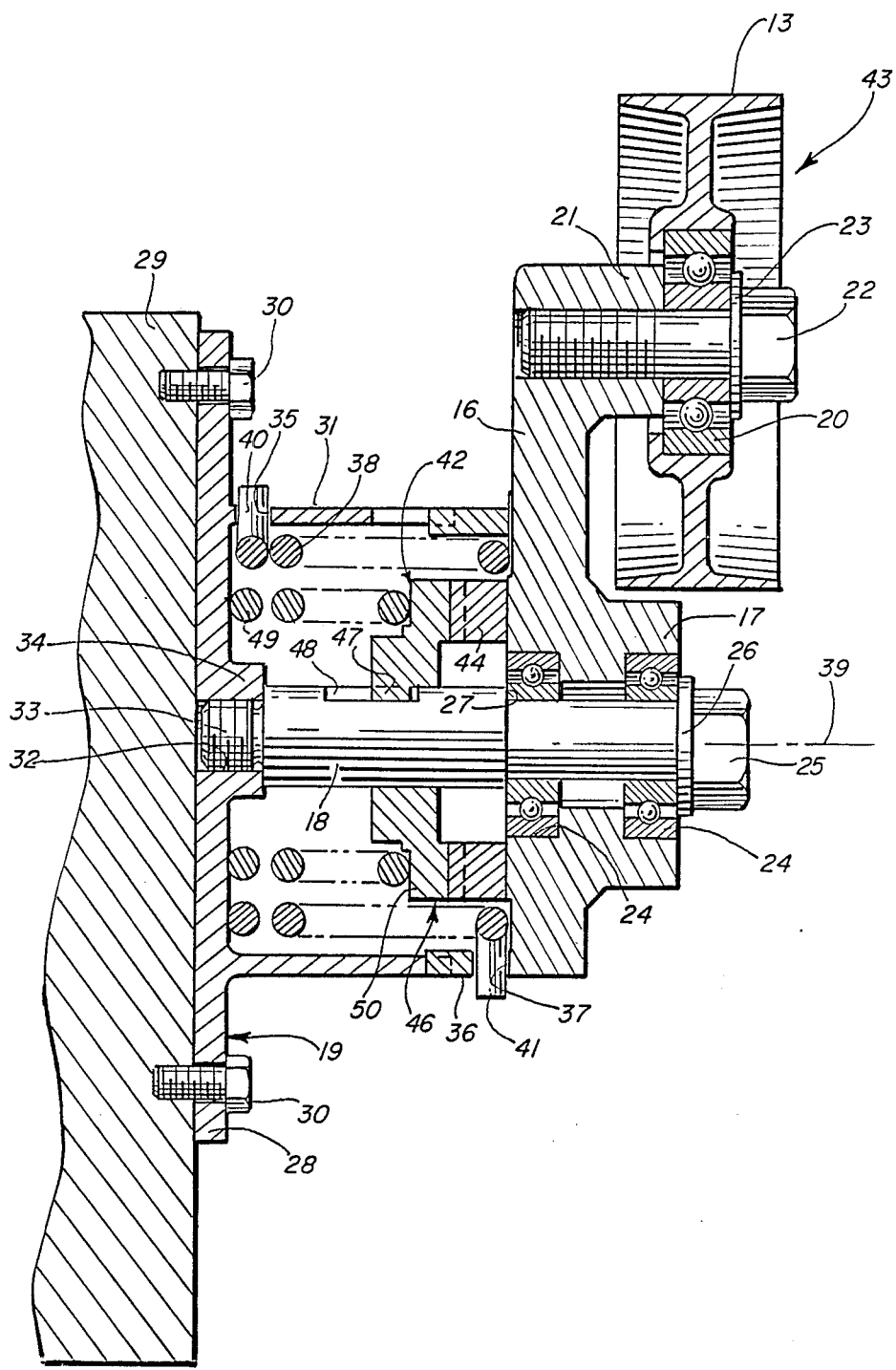
FIG. 2 is a fragmentary enlarged diametric section taken substantially along the line 2—2 of FIG. 1 illustrating the belt tensioner in greater detail.

As illustrated in greater detail in FIG. 2, the idler roller 13 is rotatably mounted by a roller bearing 20 to a turned end 21 of the arm 16. The roller bearing may be secured to the arm end by a suitable screw 22 and washer 23.

End 17 of the support arm is rotatively mounted to the shaft 18 by roller bearings 24 retained against axial displacement on the shaft by means of a screw 25 and washer 26 retaining the innermost bearing against a shoulder 27 on the shaft.

Housing 19 includes a rear wall 28 which may be secured to a base 29 by suitable screws 30. The housing further includes an outwardly extending tubular portion 31 concentric of a shaft mounting bore 32 in wall 28.

As illustrated in FIG. 2, the inner end of shaft 18 defines a reduced section 33 received in the bore 32 for supporting the shaft coaxially within the tubular outer portion 31. The midportion of wall 28 may be enlarged to define a boss 34 providing increased axial extent of the shaft end 33.

Housing portion 31 further defines a through opening 35 adjacent wall 28. Arm 16 is provided with a stopper 36 provided with a through opening 37.

A first helical coil spring 38 is disposed within housing portion 31 coaxially of axis 39 of shaft 18 and includes a first end 40 extending outwardly through opening 35 and a second end 41 extending outwardly through opening 37.

Spring 38 comprises a torsion spring urging the arm 16 in a counterclockwise direction, as seen in FIG. 1, so as to urge the idler roller 13 against the backside 14 of belt 10, with a preselected force so as to maintain the desired tension in the belt drive system.

As indicated above, it has been found in the torsioners of the prior art that such a torsion spring biasing means permits the tensioner to vibrate as a result of vibrations produced in the belt in the operation of the drive system, thereby reducing the efficiency of force transfer and shortening the useful life of the belt.

The present invention comprehends the provision of improved means generally designated 42 for effectively minimizing any such vibration in the torsioner, generally designated 43, of the invention.

More specifically, as shown in FIG. 2 and as brought out in greater detail in FIGS. 3-10, the second biasing means includes a first cam 44 fixedly secured to arm 16 by screws 45 coaxially of shaft 18.

A second cam, generally designated 46, is mounted to shaft 18 for rotatively fixed, axially movable association therewith. The cam includes an inturned key 47 received in a key slot 48 in shaft 18, as illustrated in FIG. 2.

Second cam 46 is resiliently biased toward first cam 44 by a second helical spring 49 compressed between housing wall 28 and an outer portion 50 of the second cam.

As seen in FIGS. 3-6, first cam 44 is defined by a diametrically opposite pair of flat surfaces 51 and 52 through which the screws 45 are extended to secure the first cam to the arm 16. Surfaces 51 and 52 extend approximately 90°.

Intermediate the flat surfaces 51 and 52 is a pair of ramps 53 and 54 terminating in their upper end in flat surfaces 55 and 56.

As seen in FIGS. 7-10, second cam 46 defines a pair of diametrically opposed flat surfaces 57 and 58. Intermediate the flat surfaces 57 and 58, the second cam is provided with a pair of projections 59 and 60 having inclined top surfaces 61 and 62, respectively, complementary to the incline of ramps 53 and 54, respectively.

Second bearing means 42 functions to provide a second biasing action on arm 16 so as to effectively eliminate vibration from the arm and maintain the idler roller 13 in firm biased engagement against the backside of the belt 10, notwithstanding vibrations in the belt.

More specifically, spring 49, which, as seen in FIG. 1, is disposed coaxially of shaft axis 39, coaxially within spring 38, is compressed between wall 28 and second cam portion 50 so as to urge the projections 59 and 60 toward the first cam. Movement of the second cam toward the first cam is limited by the engagement of flat surfaces 55 and 56 of the first cam with the flat surfaces 57 and 58 of the second cam. However, when the inclined surfaces 61 and 62 of the second cam projections 59 and 60 slide upwardly along the ramps 53 and 54 as a result of rotation of the arm 16 about shaft axis 39, second cam 46 is urged to the left, as seen in FIG. 2, against the biasing action of second spring 49, thereby providing a damping effect on the movement of arm 16. The frictional sliding engagement between surfaces 61 and 62 of the second cam and the ramp surfaces 53 and 54 of the first cam cooperates with the biasing action of the torsion spring 38 in urging the idler roller 13 against the backside of the power transmission belt with minimum vibration and improved maintained tension in the belt for improved long life of the belt in the operation of the drive system. Thus, the spring means 38 and 49 define means acting in torsion and in compression for applying a dual biasing force to the support arm 16.

The prevention of the vibrational hunting found in the prior art devices further provides for improved optimum efficiency in the force transfer between the components of the drive system.

As will be obvious to those skilled in the art, the spring constants of springs 38 and 49 may be suitably selected for the desired belt tension. As will further be obvious to those skilled in the art, the functioning of springs 38 and 49 may be accomplished by means of a single spring, such as spring 63 of tensioner apparatus 64 illustrated in FIG. 11.

Figure 11:
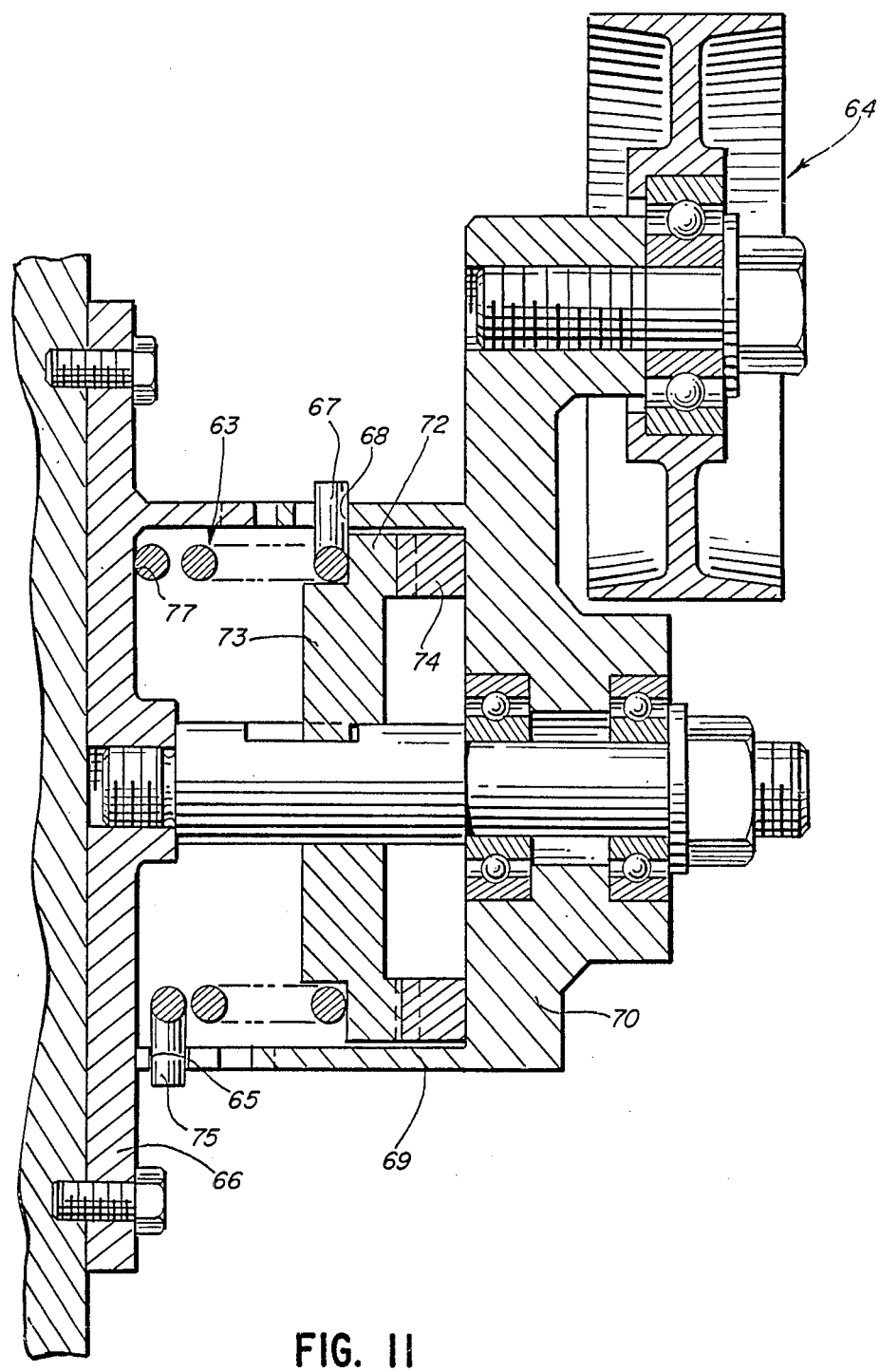
FIG. 11 is a vertical section similar to that of FIG. 2 but illustrating a modified form of tensioner embodying the invention.

More specifically, as shown in FIG. 11, spring 63 may have one end 75 retained in opening 65 of the housing 66 and its opposite end 67 retained in the opening 68 of the stopper 69 on support arm 70. Spring 63 is compressed between the rear wall 71 of the housing and outer portion 72 of the second cam 73 to urge the second cam against the first cam 74 in the same manner as accomplished by the two springs 38 and 49 in the embodiment of FIG. 2.

Thus, spring 63 provides a dual biasing of the support arm 70 in tensioner 64 in a manner similar to the springs 38 and 49 of the tensioner 43. In tensioner 43, the spring characteristics of the individual springs may be selected for optimization of the dual functions provided.

INDUSTRIAL APPLICABILITY

The automatic tensioner of the present invention provides improved maintained vibration free tensioning of the power transmission belt by means of a dual biasing action including an application of a torsion biasing force and the application of a compressional biasing force developed by the spring means. The automatic tensioner is extremely simple and economical of construction. By suitably selecting the spring constants, a wide range of power drive transmission applications may be accommodated. The tensioner is adapted for use under adverse environmental conditions, such as high temperatures, dusty environments, high humidity environments, etc.

The foregoing disclosure of specific embodiments is illustrative of the broad inventive concepts comprehended by the invention.

I claim:

1. In an apparatus for tensioning a power transmission belt having a belt-engaging element, a support having spaced first and second portions, said belt-engaging element being mounted to said first portion, and mounting means for mounting said support to swing about said second portion to urge said belt-engaging element selectively toward and away from a power transmission belt to be tensioned thereby, the improvement comprising spring means for biasing said support including first spring means acting in torsion to provide a first biasing force urging the belt-engaging element toward the power transmission belt in providing a dual biasing force to said support and second spring means acting in compression for applying a second biasing force urging the belt-engaging element toward the power transmission belt in providing a dual biasing force to said support.

2. The belt tensioning apparatus of claim 1 wherein said first and second spring means comprises a pair of helical springs.

3. The belt tensioning apparatus of claim 1 wherein said second spring means includes cam means for converting angular displacement of said support about said mounting means to variable compression of said second spring means.

4. The belt tensioning apparatus of claim 1 wherein said first and second spring means comprise a pair of helical springs, said means comprising cam means for converting angular displacement of said arm about said mounting means to a variable compression of said second spring means.

5. The belt tensioning apparatus of claim 1 wherein said first and second spring means comprise a pair of helical springs, said second spring means including inclined cam means for converting angular displacement of said arm about said mounting means to a variable compression of said second spring means.

6. The belt tensioning apparatus of claim 1 wherein said first and second spring means comprises a pair of coaxial helical springs.

7. The belt tensioning apparatus of claim 1 wherein said support comprises an arm and said first and second portions comprise opposite end portions of the arm.

8. The belt tensioning apparatus of claim 1 wherein said belt-engaging element comprises an idler roller.

9. The belt tensioning apparatus of claim 1 wherein said first spring means comprises a helical spring having one end fixed to said mounting means and an opposite end connected to said support.

10. The belt tensioning apparatus of claim 1 wherein said second spring means comprises a first cam rotatively movable with said support, a second axially movable, rotatively fixed cam, and a compression spring urging said second cam against said first cam.

11. The belt tensioning apparatus of claim 1 wherein said second spring means comprises a first cam rotatively movable with said support and defining a first inclined surface, a second axially movable, rotatively fixed cam defining a second inclined surface facially engaging said first inclined surface, and a compression spring urging said second cam slidably against said first cam.

12. The belt tensioning apparatus of claim 1 wherein said second spring means comprises a first cam rotatively movable with said support and defining a first inclined surface, a second axially movable, rotatively fixed cam defining a second inclined surface facially engaging said first inclined surface, and a helical compression spring urging said second cam slidably against said first cam.

13. The belt tensioning apparatus of claim 1 wherein said mounting means defines an axis about which said second portion of said support swings, and said first and second spring means comprises helical spring means extending coaxially about said axis.

14. The belt tensioning apparatus of claim 1 wherein said mounting means comprises a shaft defining a longitudinal axis about which said second portion of said support swings, and at least one of said first and second spring means comprises helical spring means extending coaxially about said axis.

15. The belt tensioning apparatus of claim 1 wherein said mounting means comprises a shaft defining a longitudinal axis about which said second portion of said support swings, said first and second spring means comprise helical spring means extending coaxially about said axis, said second means comprises a first cam rotatively movable with said support, a second axially movable, rotatively fixed cam, and a compression spring urging said second cam against said first cam.

16. The belt tensioning apparatus of claim 1 wherein said mounting means comprises a shaft defining a longitudinal axis about which said second portion of said support swings, said first and second spring means comprises helical spring means extending coaxially about said axis, said second spring means comprises a first cam rotatively movable with said support, a second axially movable, rotatively fixed cam, and a compression spring urging said second cam against said first cam, said first spring means comprising a helical spring having one end fixed to said mounting means and an opposite end connected to said support, and extending coaxially about said axis.

17. The belt tensioning apparatus of claim 1 wherein said mounting means includes a fixed housing and a mounting shaft fixed in said housing, said support second portion being fixed to said shaft.

18. The belt tensioning apparatus of claim 1 wherein said means acting in compression comprises a first cam rotatively movable with said support and defining a first inclined surface, a second axially movable, rotatively fixed cam defining a second inclined surface facially engaging said first inclined surface, and a compression spring urging said second cam slidably against said first cam, and means on said second cam slidably engaging said first cam for limiting the movement of said second cam toward said first cam.

19. The belt tensioning apparatus of claim 1 wherein said means acting in compression comprises a first cam rotatively movable with said support and defining a first inclined surface, a second axially movable, rotatively fixed cam defining a second inclined surface facially engaging said first inclined surface, and a compression spring urging said second cam slidably against said first cam, and means on said second cam slidably engaging said first cam for limiting the movement of said second cam toward said first cam, said mounting means comprising a shaft and said second cam being splined to said shaft.

20. In an apparatus for tensioning a power transmission belt having a belt-engaging element, a support having spaced first and second portions, said belt-engaging element being mounted to said first portion, and mounting means for mounting said support to swing about said second portion to urge said belt-engaging element selectively toward and away from a power transmission belt to be tensioned thereby, said support first portion defining an axis of rotation, the improvement comprising:

a single coil spring; and means cooperating with said coil spring for biasing said support including means responsive to a torsion force developed by said coil spring and means responsive to a compressive force developed by said coil spring.

* * * * *